United States Patent
Gruev et al.

(10) Patent No.: US 7,924,332 B2
(45) Date of Patent: Apr. 12, 2011

(54) CURRENT/VOLTAGE MODE IMAGE SENSOR WITH SWITCHLESS ACTIVE PIXELS

(75) Inventors: Viktor Gruev, Philadelphia, PA (US); Zheng Yang, Philadelphia, PA (US); Jan van der Spiegel, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 991 days.

(21) Appl. No.: 11/754,048

(22) Filed: May 25, 2007

(65) Prior Publication Data
US 2008/0291309 A1  Nov. 27, 2008

(51) Int. Cl.
*H04N 3/14* (2006.01)
*H04N 9/64* (2006.01)
*H01L 27/00* (2006.01)

(52) U.S. Cl. ...... 348/308; 348/248; 348/310; 250/208.1
(58) Field of Classification Search ........... 348/248, 348/300–310, 313; 250/208.1
See application file for complete search history.

(56) References Cited

U.S. PATENT DOCUMENTS

| | | | |
|---|---|---|---|
| 5,981,932 A | 11/1999 | Guerrieri et al. | |
| 6,486,504 B1 | 11/2002 | Guidash | |
| 7,193,456 B1* | 3/2007 | Aude | 327/581 |
| 2004/0041080 A1* | 3/2004 | Barna et al. | 250/214 R |
| 2004/0135911 A1 | 7/2004 | Nathan et al. | |
| 2006/0118781 A1* | 6/2006 | Rhodes | 257/40 |

FOREIGN PATENT DOCUMENTS
WO  WO 2006/042407 A1  4/2006

OTHER PUBLICATIONS

Andreou, A.G., et al., "A 48,000 pixel, 590,000 transistor silicon retina in current-mode subthreshold CMOS," Proc. 37th Midwest Symposium on Circuits and Systems, 1994, 97-102.
Andreou, A.G., et al., "Analog VLSI neuromorphic image acquisition and pre-processing systems," Neural Networks, 1995, 8(78), 1323-1347.
Boahen, K.A., et al., "A retinomorphic vision systems," IEEE Micro, 1996, 16(5), 30-39.
Boussaid, F., et al., An ultra-low operating technique for mega-pixels current-mediated CMOS imagers, IEEE Trans. On Consumer Electronics, 2004, 50, 46-53.

(Continued)

*Primary Examiner* — Lin Ye
*Assistant Examiner* — Mekonnen Dagnew
(74) *Attorney, Agent, or Firm* — Woodcock Washburn, LLP

(57) ABSTRACT

A voltage and current mode active pixel sensor for high resolution imaging is presented. The photo pixel is composed of a photodiode and two transistors: reset and transconductance amplifier transistor. The switch transistor is moved outside the pixel, allowing for lower pixel pitch and increased linearity of the output photocurrent. The reset and amplifier (readout) transistors may also be shared among adjacent pixels by the introduction of transfer switches between the photodiodes and the source of the reset transistor and the gate of the readout transistor. The switch transistor outside the pixels provides biasing voltages or currents to the readout transistors to selectively turn them on when readout of the corresponding photodiode is desired and turns the readout transistor off when the corresponding photodiode is not to be read out. The increased linearity of the image sensor has greatly reduced spatial variations across the image after correlated double sampling and the column fix pattern noise is greatly improved.

21 Claims, 11 Drawing Sheets

OTHER PUBLICATIONS

Burns, J., et al., "A wafer-scale 3-D circuit integration technology," IEEE Trans. On Electron Devices, 2006, 53, 2507-2516.

Delbruck, T., et al., "Adaptive photoreceptor with wide dynamic range," in Proc. IEEE Intl. Symp. On Circuits and Systems, 1994, 339-342.

Dudek, P., et al., "A general-purpose processor-per-pixel analog SIMD vision chip," IEEE Transactions on Circuits and Systems-I; regular papers, 2005, 52(1), 13-20.

El Gamal, A., et al., "CMOS image sensors," IEEE Circuits Devises Mag., 2005, 21(3), 6-20.

Espejo, S., et al., "Switched-current techniques for image processing cellular neural networks in MOS VLSI," Proc. IEEE Int. Symposium on Circuits and Systems, 1992, 1537-1540.

Etienne-Cummings, "Single-capacitor-single-contact active pixel," Proc. IEEE ISCAS, Geneva, Switzerland, 2000, V177-V180.

Etienne-Cummings, R., et al., "A focal plane visual motion measurement sensor," IEEE Trans. Circuits and Sys. I: Fundamental theory and applications, 1997, 44(1), 55-66.

Etienne-Cummings, R., et al., "Neuromorphic vision systems for mobile applications," Proc. IEEE CICO, San Jose, CA, 2006, 531-534.

Fossum, E.R. "CMOS image sensor: electronic camera-on-a-chip," IEEE Trans. Electron Devices, 1997, 44, 1689-1698.

Funatsu, E., et al., "An artificial retina chip with current-mode focal plane image processing functions," IEEE Transactions on Electronic Devices, 1997, 44(10), 1777-1782.

Gruev, V., et al., "Implementation of steerable spatiotemporal image filters on the focal plane," IEEE Trans. Circuits Syst. II, 2002, 49(4), 233-244.

Gruev, V., et al., "Linear current mode imager with low fix pattern noise," Proc. IEEE ISCAS, Vancouver, CA, 2004, 860-863.

Guidash, R.M., et al., "A 0.6 um CMOS pinned photodiode color imager technology," Electron Devices Meeting, Technical Digest, International, 1997, 927-929.

Iida, Y., et al., "A ¼-inch 330k square pixel progressive scan CMOS active pixel image sensor," IEEE J. Solid-State Circuits, 1994, 32, 2042-2047.

Kim, Y.C., et al., "½ inch 7.2 mega-pixel CMOS image sensor with 2.25 μm pixel using 4-shared pixel structure for pixel-level charge summation," in Digest. IEEE ISCCC, 2006, 494-495.

Philipp, R., et al., "Linear current-mode active-pixels-sensor," IEEE J. Solid-State Circuits, 2007, 42(11), 2482-2491.

Yang, Z., et al., "A CMOS linear voltage/current dual-mode imager," ISCAS, 2006, 3574-3577.

Yoshihara, S., et al., "A 1/1.8 inch 6.4Mpixel 60fps CMOS image sensor with seamless mode change," in Digest. IEEE ISCCC, 2006, 492-493.

* cited by examiner

CURRENT/VOLTAGE MODE IMAGE SENSOR WITH SWITCHLESS ACTIVE PIXELS

GOVERNMENT SUPPORT

The present invention was supported by the U.S. Air Force Office of Scientific Research (AFOSR) under Grant Number FA9550-05-1-0052. The government may have certain rights in the invention.

FIELD OF THE INVENTION

The present invention relates to a current/voltage mode active pixel sensor architecture in which the pixel sensor is composed of 1.5 or 2.0 transistors per pixel, thus allowing for higher resolution and more pixels per given area of silicon.

BACKGROUND OF THE INVENTION

High resolution imaging is closely related to the number of transistors and interconnections per pixel. Traditional voltage mode image sensors have been based on the three transistor (3T) active pixel sensor (APS) topology which has been coined by E. R. Fossum in "CMOS Image Sensor: Electronic Camera-On-A-Chip," IEEE Trans. Electron Devices, Vol. 44, pp. 1689-1698, October 1997. The three transistor topology, which has been widely accepted as the industry standard, is composed of a reset transistor, switch transistor and a source follower (i.e., an active element that buffers the capacitance at the photodiode node from the large line capacitance). One of the drawbacks of the 3T APS are high dark currents and high temporal noise. In order to address these problems, a pinned photodiode was introduced as a part of a four transistor (4T) APS. (See, e.g., "A 0.6 µm CMOS pinned photodiode color imager technology," Guidash, et al., Electron Devices Meeting, 1997. Technical Digest, International Dec. 7-10, 1997, Pages: 927-929.) The buried photodiode had lower dark current and the extra switch transistor allowed for truly correlated double sampling (CDS). The lower temporal noise variations have yielded impressive improvements in the signal to noise ratio, with staggering numbers of up to 60 dB. Unfortunately, the introduction of the extra switch transistor comes at a cost of larger pixel size and a lowering of the resolution of the image sensor.

In order to achieve high resolution voltage mode imaging, various pixel schemes have been published and they are summarized in Table 1. Y. Tida, et al. presented in "A ¼-Inch 330 k Square Pixel Progressive Scan CMOS Active Pixel Image Sensor," IEEE J. Solid-State Circuits, v. 32, pp. 2042-2047, July 1994, two different pixel topologies in order to decrease the transistor count and interconnections per pixel. Both pixel topologies rely on capacitive addressing of the pixel resulting in low pixel sensitivity and increased spatial variations due to the increased capacitance at the photodiode node. In an article entitled "Single-Capacitor-Single-Contact Active Pixel," Proc. IEEE ISCAS, Geneva, Switzerland, May 2000, Etienne-Cummings presented a single pixel with a single contact using a capacitive addressing scheme. However, large spatial variations, such as high fixed pattern noise, caused by gain variations of the in-pixel BJT, were one of the drawbacks of this implementation. In addition, various transistor sharing schemes on a neighborhood of pixels have been widely reported throughout the literature. In this case, four or eight 4T APS pixels share the reset and/or the read-out transistors among the four or eight pixels. This reduces the number of transistors per pixel to 1.75 or 1.25, respectively. (See Y. C. Kim, et al., "½ inch 7.2 mega-pixel CMOS image sensor with 2.25 µm pixel using 4-shared pixel structure for pixel-level charge summation," in Digest. IEEE ISCCC, pp. 494-495, 2006; and S. Yoshihara, et al., "A 1/1.8-inch 6.4 Mpixel 60 fps CMOS Image Sensor with Seamless Mode Change," in Digest. IEEE ISCCC, pp. 492-493, 2006.) Also, a small pitch, high fill factor image sensor was fabricated in a stack 3-D technology, where the photodiode was placed in a top tier and read out circuitry was placed in subsequent tiers, by J. Burns, et al., "A Wafer-Scale 3-D Circuit Integration Technology," IEEE Trans. On Electron Devices, v. 53, pp. 2507-2516, October 2006. The stack 3-D fabrication technology has allowed for almost 100% fill factor since an entire tier is dedicated to the photodiode. Unfortunately, the shallow photodiode and high parasitic capacitance associated with intra-tier connections have had a direct impact on the poor sensitivity of the image sensor.

TABLE 1

Summary of voltage mode active pixel sensors.

| Pixel Types | 3T APS | 4T APS | Capacitive Address | Single Transistor | Single BJT Pixel | Shared 4T APS (1.75T) |
|---|---|---|---|---|---|---|
| Reference | Fossum et. al | Guidash et al. | Iida et. al | Iida et. al | Etienne-Cummings | Kim et al. |
| Transistors per pixel | 3 | 4 | 2 | 1 | 1 (BJT) | 7 (per 4 pixels) |
| Capacitors per pixel | 0 | 0 | 1 | 1 | 1 | 0 |
| Interconnections per pixel | 5 | 6 | 5 | 3 | | 9 (per 4 pixels) |
| Output | voltage | voltage | voltage | voltage | voltage | voltage |
| FPN (%) | 0.1% | 0.1% | average | average | 3.5 | excellent |
| SNR (dB) | 45 | 45-60 | ? | ? | 35 | 46.7 |
| Sensitivity | good | excellent | medium | poor | poor | excellent |

Current mode imaging has been a rival to the more traditional voltage mode APS, mentioned above. Current mode imaging techniques have spun a multitude of sensors, where visual information extraction at the focal plane has been the primary focus and a major strength of this technique. Conventional current mode imaging techniques are described by A. G. Andreou et al. in "A 48,000 pixel, 590,000 transistor silicon retina in current-mode subthreshold CMOS," in Proc. 37th Midwest Symposium on Circuits and Systems, pp. 97-102, 1994; by T. Delbruck et al. in "Adaptive photoreceptor with wide dynamic range," in Proc. IEEE Intl. Symp. on Circuits and Systems, pp. 339-342, 1994; by A. G. Andreou et al. in "Analog VLSI neuromorphic image acquisition and pre-processing systems," Neural Networks, Vol. 8, No. 78, pp. 1323-1347, 1995; by K. A. Boahen et al. in "A retinomorphic vision systems," IEEE Micro, Vol. 16, No. 5, pp. 30-39, October 1996; by S. Espejo et al. in "Switched-current techniques for image processing cellular neural networks in MOS VLSI," Proc. IEEE Int. Symposium on Circuits and Systems, pp. 1537-1540, 1992; by R. Etienne-Cummings et al. in "A focal plane visual motion measurement sensor," IEEE Trans. Circuits and Sys. I: Fundamental Theory and Applications, Vol. 44, No. 1, pp. 55-66, January 1997; by Eiichi Funatsu et al. in "An Artificial Retina Chip with Current-Mode Focal Plane Image Processing Functions," IEEE Transactions on Electron Devices, Vol. 44, No. 10, October 1997; and by P. Dudek et al. in "A general-purpose processor-per-pixel analog SIMD vision chip," IEEE Transactions on Circuits and Systems-I; Regular Papers, Vol. 52, No. 1, January 2005. The limiting factor in such current mode imaging sensors has been the low image quality due to the large fixed pattern noise (see Table 2).

TABLE 2

Summary of current mode image sensors.

| Pixel Types | Logarithmic Pixel | Quadratic current APS | Linear current APS |
|---|---|---|---|
| Reference | Mead et. al | | Phillip et al. |
| Transistors per pixel | high | high | 3 |
| Capacitors per pixel | | | 0 |
| Interconnections per pixel | high | high | 5 |
| Output | | | current |
| FPN (%) | >3% | high | 0.5% |
| SNR (dB) | | | 41 |
| Sensitivity | excellent | Excellent | good |

The primary contributor of fixed pattern noise in both voltage and current mode APS is the threshold voltage variations of the read-out transistor between pixels in the imaging array. As described by Fossum, in voltage mode APS, the linear voltage output with respect to the photodiode voltage coupled with correlated double sampling (CDS) circuits allows for suppression of threshold variations between readout transistors in the imaging array. In the current mode image sensor, the relationship between light intensity to output current can be logarithmic (see Delbruck et al.), quadratic (F. Boussaid, et al., "An ultra-low ower operating technique for mega-pixels current-mediated CMOS imagers," *IEEE Trans. on Consumer Electronics*, v. 50, pp. 46-54, February 2004), or linear (see R. Etienne-Cummings, et al., "Neuromorphic vision systems for mobile applications," in *Proc. IEEE CICC*. San Jose, Calif., 2006, San Jose, Calif.; and V. Gruev, et al., "Linear Current Mode Imager with Low Fix Pattern Noise," *Proc. IEEE ISCAS*, Vancouver, Canada, May 2004). Due to the non-linear relationship between light and output current noted by Delbruck et al. versus Boussaid et al, canceling out voltage threshold variations is not easily performed on a chip. Linear photo current output with respect to photodiode voltage has been achieved by Etienne-Cummings, et al. and Gruev et al. by operating the read-out transistor of the pixel in linear mode. The linear current output coupled with current conveyers and current mode memory circuits has allowed for high read out speeds (high frame rates) and low fixed pattern noise (FPN) figures. However, one of the factors which has limited the linearity of the current output (hence impacting the FPN figure) has been the finite on-resistance of the access transistor in the pixel.

A current/voltage mode active pixel sensor is desired that overcomes the limitations of such prior art sensors and limits the size and number of transistors for each pixel so as to reduce resistance and to increase resolution. The present invention addresses this need in the art.

SUMMARY OF THE INVENTION

The present invention relates to an imaging sensor based on the linear current mode APS paradigm in which the pixel addressing (switch) transistor has been moved outside the pixel, thus allowing for an efficient realization of two transistors per pixel and effectively reducing the size (pitch) of the pixel. Furthermore, eliminating the switch transistor from the pixel has allowed for higher linearity between the output photo current and photodiode voltage. The improved linearity has a direct influence on the spatial variations across the sensor and therefore a lowering of the FPN figures.

An image sensor in accordance with the invention is characterized by a biasing circuit and a pixel array, where each pixel in the pixel array comprises a photodiode, a reset transistor, and a readout transistor but no address switching transistor. The reset transistor controls operation of the photodiode and the gate voltage of the readout transistor. Each readout transistor is configured to provide an output proportional to a voltage or current output of the photodiode, where the drains of readout transistors of each pixel in the same row or column are connected directly together and to the biasing circuit and/or the sources of readout transistors of each pixel in the same row or column are connected directly together and to the biasing circuit. The gate of the readout transistor is connected to the biasing circuit via the reset transistor, while the voltages or currents from the biasing circuit are applied to the readout transistor to turn it on when an output of the photodiode is to be read out and to turn it off when an output of the photodiode is not to be read out.

Several embodiments are disclosed. In a first current mode embodiment, the photodiode is connected between ground or a suitable DC voltage and a source (or drain) of the reset transistor and a drain (or the source) of the reset transistor is connected to a reset voltage. The gate of the readout transistor is connected to the source of the reset transistor. In this configuration, 2 transistors are provided per pixel. The drains of each readout transistor in a row are connected to each other in a direction parallel to the row and the sources of each readout transistor in a column are connected to each other in a direction perpendicular to the row, thus defining x,y coordinate directions.

In an exemplary configuration, the biasing circuit including a current conveyor circuit is provided for each row or column of the pixel array and pins an input line thereto to a reference voltage. For this purpose, the current conveyor circuit may comprise an operational amplifier connected to the reference voltage at a first input and to a row or column of connected drains for the readout transistors of each pixel in the row of the pixel array. A row or column addressing switch outside the imaging array may be connected to an output of each current conveyor circuit for selecting the corresponding row or column for read out. In addition, a correlated double sampling unit may be connected to each addressing switch for sampling and storing an input photocurrent from one or more of the pixels. A column or row addressing switch may also be provided that is connected to each column or row of connected sources for the readout transistors of each pixel in each column or row of the pixel array. A global current conveyor circuit may also be used for the entire pixel array, rather than just for each row thereof.

In a second current mode embodiment, the photodiode is connected between ground (or a suitable DC voltage) and a transfer switch transistor to a source of the reset transistor, and a drain of the reset transistor is connected to a reset voltage. In this embodiment, the reset transistor is shared by a plurality of pixels (e.g., 4) in the pixel array. In this embodiment, a gate of the readout transistor is connected to the source of the reset transistor and the readout transistor is also shared by the plurality of pixels in the pixel array. To facilitate addressing of the pixels, closing of the transfer switch transistor for a pixel connects a photodiode for the pixel to the gate of the readout transistor. Also, the transfer switch transistor of each pixel in a row is controlled by an addressing switch that selectively connects the transfer switch transistors of the row to a voltage source so as to select the pixels containing each of the transfer switch transistors. In addition, the drain of the reset transistor of the plurality of pixels is connected to the reset transistors of other pluralities of pixels in common rows of the pixel array, and the drains of the connected reset transistors are selectively connected to the biasing circuit. In an exemplary configuration, the sources of each readout transistor in a column of pixels are connected to each other and to ground and the drains of each readout transistor in the column of pixels are connected to each other directly and to the biasing circuit through an addressing switch. In this 1.5 transistor per pixel embodiment, the biasing circuit may comprise a current conveyor that pins an input line thereto to a reference voltage and a correlated double sampling unit connected to an output of the current conveyor for sampling and storing an input photocurrent from one or more of the pixels.

In a third embodiment of an imaging sensor of the invention, a voltage mode imaging sensor with 1.5 transistors per pixel is contemplated. In this embodiment, the drains of each readout transistor in a column of pixels are connected directly to each other and to a reference voltage. The sources of each readout transistor in the column of pixels are connected directly together and to the biasing circuit through an addressing switch. In this embodiment, the biasing circuit may comprise a bias current source. A voltage mode correlated double sampling unit is connected to the sources of the readout transistors in the column of pixels through the addressing switch.

These and other possible exemplary embodiments of the invention will become apparent to those skilled in the art based on the following detailed description of exemplary embodiments of the invention.

BRIEF DESCRIPTION OF THE DRAWINGS

The imaging sensor in accordance with the present invention is further described with reference to the accompanying drawings, in which.

DETAILED DESCRIPTION OF ILLUSTRATIVE EMBODIMENTS

Certain specific details are set forth in the following description with respect to FIGS. 1-11 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Figure 1:
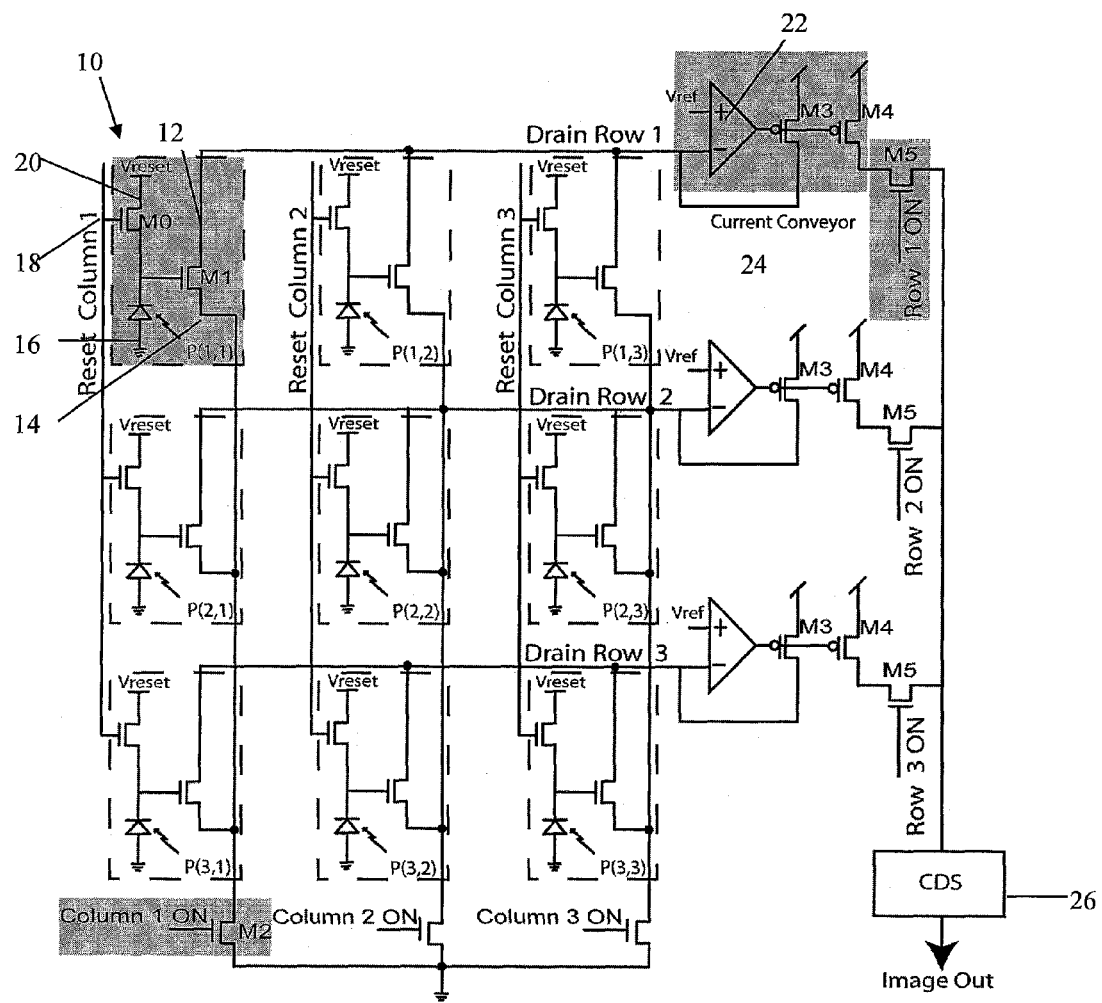
FIG. 1 illustrates a pixel schematic and overview of the overall image sensor architecture of the invention.

A block diagram of the pixel schematic for an exemplary embodiment of a two transistors per pixel linear current mode CMOS imager is presented in FIG. 1. The photo pixel 10 comprises a photodiode P and two transistors: a reset transistor $M_0$ and a transconductance amplifier $M_1$. As used herein, photodiode is considered equivalent in function to a photogate, a pinned photodiode, a phototransistor, or any other known comparable sensing element known to those skilled in the art. There are five line connections per pixel: drain (12) and source (14) line of the read out transistor $M_1$, ground line 16, reset control line 18 and reset voltage line 20. The key addressing requirement for the embodiment of FIG. 1 is that the drain (12) and source (14) lines of the transconductance amplifier $M_1$ must be connected between two shared busses that are orthogonal to each other: a vertical bus selects the active column, while a horizontal bus carries the output current. This is the case because only one transistor is used for two addressing dimensions; therefore, the addressing lines must be perpendicular to correspond to the x,y axes. In addition, those skilled in the art will appreciate that the addressing scheme may also be adapted for use with polar coordinates (r,θ). An alternate embodiment will be described below with respect to FIG. 4 in which the perpendicularity requirement may be relaxed.

The orthogonality of the drain lines 12 and source lines 14 can be observed in FIG. 1, where all $M_1$ transistors in a row (column) connect their drains 12 (sources 14) to a horizontal (vertical) line. The orthogonal requirement allows for a direct control over the drain-source ($V_{ds}$) voltage drop across the read out transistor $M_1$ via the switch transistor $M_2$ of all pixels in the imaging array. Hence, the access of a particular pixel(s)

is directly controlled via the drain-source voltage of transistor $M_1$. If a pixel should be turned on, the $V_{ds}$ is set to a non-zero value. Conversely, if a pixel should be turned off, the $V_{ds}$ is set to zero and/or the gate-source voltage $V_{gs}$ of transistor $M_1$ is reduced below a threshold. In order to understand the control principle of the pixel, the biasing circuit that may be on the same chip as the imaging device or placed outside the chip for setting the drain and source voltage of the read out transistor $M_1$ is discussed next.

The voltage at the drain 12 of transistor $M_1$ is determined by the reference voltage ($V_{ref}$) at the positive terminal of the operational amplifier 22 and it is set to be about 0.2V. The operational amplifier 22 is connected in a negative feedback configuration via transistor $M_3$, effectively implementing a second generation current conveyor circuit 24. The current conveyor circuit may implement the bias circuit in a multitude of ways, with or without operational amplifier 22. Also, depending upon the implementation of the readout transistor $M_1$ as PMOS or NMOS, the current conveyor circuit 24 may be connected to either its source or drain. Also, the reset transistor can be implemented as PMOS or NMOS. The output of the current conveyer 24 is provided via transistor $M_4$, which replicates the input current provided form the photo pixel 10 of interest. Both transistors $M_3$ and $M_4$ operate in the saturation region, which ensures correct replication of the input photo current. For simplicity, only transistor $M_3$ and $M_4$ are shown in FIG. 1. In the actual implementation, a regulated cascade scheme has been used in order to minimize channel length modulation effects. The current conveyor 24 effectively masks the parasitic capacitance on the drain line 12 by pinning the input line of the row buss to fixed voltage $V_{ref}$ and passing the pixel currents to the CDS units 26. Hence, the read-out line does not need to be charged or discharged during the read out phase, which leads to higher read-out speeds (i.e. higher frame rates). It is noted that in accordance with the invention all access switches for addressing the pixels are physically (or logically) outside the imaging array so as to simplify pixel layout. These access switches control the voltage drop across or the current output of the readout transistors. The unselected pixels output current is driven to zero by making the voltage drop across the drain and source go to zero and/or by driving the gate to source voltage below a threshold. Those skilled in the art will appreciate that elimination of the address transistor in each pixel leads to a smaller pixel size and hence higher resolution since more pixels may be provided in a given area of silicon. Moreover, unlike conventional APS pixels, the pixels of the embodiment of FIG. 1 operate in the current domain.

Figure 2:
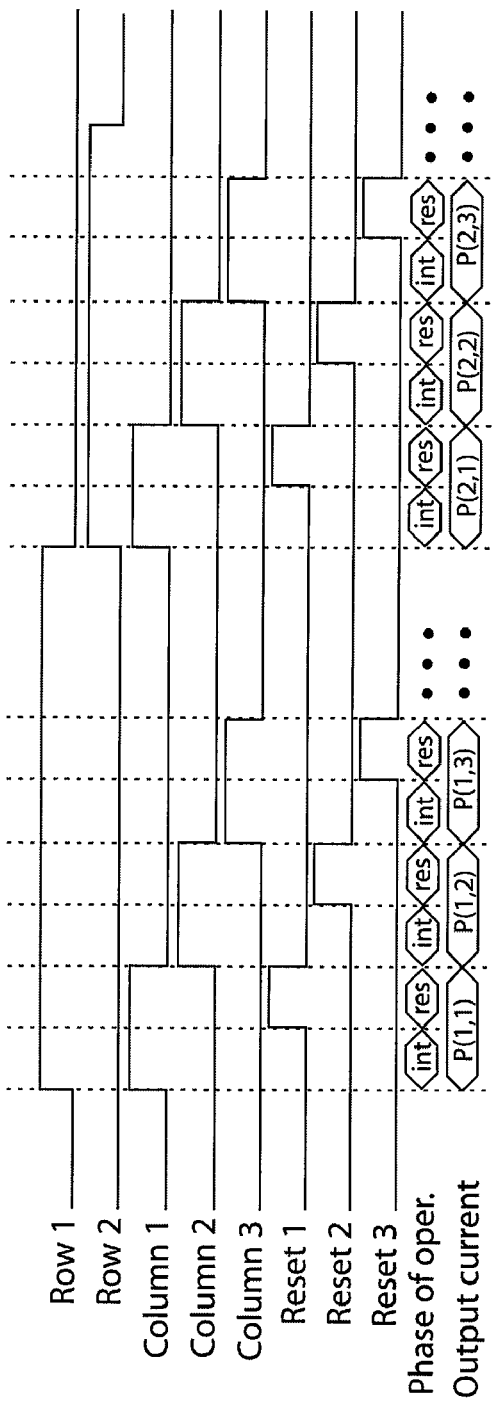
FIG. 2 illustrates a timing diagram for a two transistor image sensor in accordance with the invention.

The timing diagram for all necessary control signals that are needed to operate the image sensor 10 of FIG. 1 is presented in FIG. 2. The timing control signals for the first three pixels of the first two rows are presented. The photo current of a particular pixel at the end of the integration time is abbreviated as int and the reset current of the same pixel is abbreviated as res. As illustrated, the reset of the control signals for the entire imaging array are easily extrapolated from the presented timing signals.

The drain voltage of the $M_1$ transistor across all pixels, regardless whether they are in the on or off state, is always set to $V_{ref}$. Only the source voltage of the $M_1$ transistor is manipulated in order to access a pixel. For example, if switch transistor $M_2$ in column 1 is turned on (see FIG. 2), the drain voltage of pixels numerated as P(x,1) for x=1 to N, where N is the number of pixels in the column (N=3 in FIG. 3), are connected to ground. A $V_{ds}$ drop of 0.2V is established across these transistors and their respective currents are provided in parallel on the horizontal bus lines to the column-parallel current conveyors 24. Hence, the output current I(1,1) of pixel P(1, 1) in FIG. 3 flows on drain row one. Similarly, the other currents, corresponding to the pixels of column one, I(2,1), I(3,1), etc. are flowing on the horizontal bus lines. In this embodiment, when the pixel is selected, the readout transistor $M_1$ works in the linear region acting as a transconductor.

Figure 3:
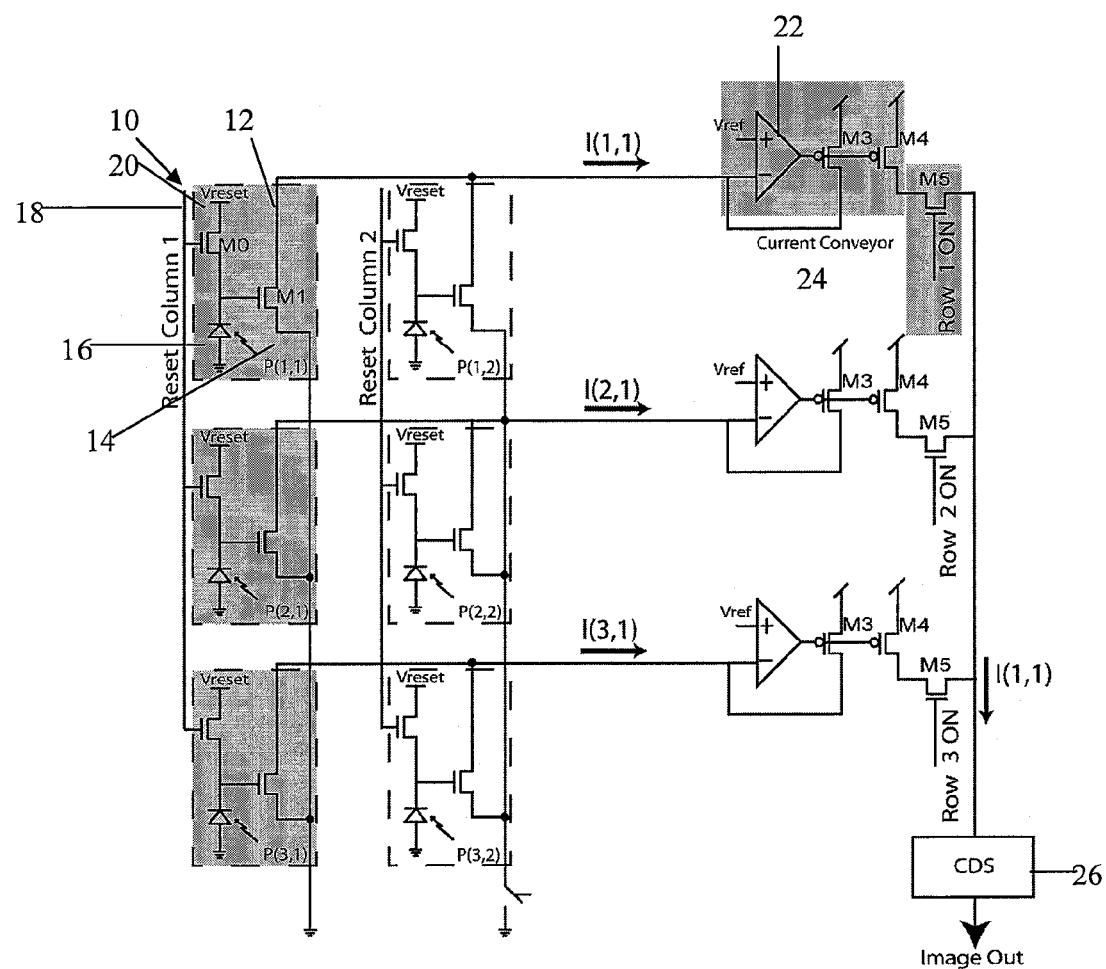
FIG. 3 illustrates the control scheme for the two transistor image sensor of the invention.

The next step is to select a particular row of pixels. This is achieved via the vertical switch transistor $M_5$, clocked by the signal Column 1 in FIG. 2. This turns on the vertical address switch transistors $M_5$ for row 1, while address switch transistor $M_5$ in rows 2 through K, where K is the number of rows, (K=3 in FIG. 3) are off. Hence, only pixel P(1,1) is accessed and is allowed to provide its output photocurrent to the correlated double sampling unit (CDS) 26. The CDS unit 26 is implemented as a current memory cell and samples the integrated photo current from pixel P(1,1) at the end of integration as shown in FIG. 3. The next step is to reset pixel P(1,1) by turning on the column reset line 1 by applying signal Reset1 (FIG. 2). All pixels in column 1 are reset in parallel and a reset current from pixel P(1,1) flows through the CDS unit 26. The final output from the CDS unit 26 is the difference between the integrated photo current and the reset photo current of pixel P(1,1).

Pixel P(1,2) is read out next by switching on transistor $M_2$ of the 2nd column (see timing diagram in FIG. 2). Once pixel P(1,2) is accessed and its integrated photo current is memorized in the correlated double sampling (CDS) unit 26 outside the pixel array 10. The CDS unit 26 corrects for threshold variations among pixels, which is the main cause of fixed pattern noise (FPN). The pixel is reset by turning on the reset line 2. The same timing steps are performed by connecting each row and column bus to either $V_{DD}$ or ground through switches outside the pixel array 10 for all pixels in the pixel array 10. At any time, only one selected column of the pixel array 10 connects to ground, while the drain potential of the rest of the pixels connect to $V_{DD}$. This ensures zero voltage drop across the drain and source to the readout transistors $M_1$ of all the unselected pixels, forcing them to output no current to the output lines. The switches outside the pixel array 10 are preferably designed with a high aspect ratio in order to minimize the voltage drop across them. They are controlled by a shift register (not shown) that scans through all the columns, similar to a conventional column-parallel imager.

From the timing diagram in FIG. 2, it is apparent that the maximum integration period for a pixel is the time it takes to scan one row, since a single CDS unit 26 and column parallel reset is employed. In order to increase the integration period, a row parallel CDS unit 26 should be used or an additional reset transistor per pixel with a global CDS unit should be used. The first proposed method is preferred in order to minimize the pixel size at the expense of higher power consumption due to column parallel access.

In order to turn off a column(s) of pixels, the switch transistor(s) $M_2$ is (are) turned off (signal Column2 in FIG. 2). In FIG. 3, the second column is turned off and the source voltage of transistor $M_1$ in the 2nd column is floating and it will start to charge from 0V to approximately Vref (0.2V) in order to turn off the pixel ($V_{ds}$=0). For a small imaging array, the time to charge up the source line can be faster than the minimum pixel scanning time and it will not cause problems during read out. For large imaging arrays and hence large parasitic capacitance, switch transistor $M_2$ should be implemented as a differential switch. The differential switch should connect the source of the off-pixels to Vref (0.2V) to force $V_{ds}$ to be equal to 0V.

At the end of the integration cycle, the voltage on the photodiode can be represented as $V_{photo}$ and the integrated photo current is presented by Equation (1):

$$I_{photo} = k_n \frac{W}{L}\left[(V_{photo} - V_t)V_{ref} - \frac{V_{ref}^2}{2}\right] \quad (1)$$

In Equation (1), W/L is the aspect ratio, $V_t$ is the threshold voltage and $V_{ref}$ is the reference voltage across the drain and source terminal of the $M_1$ transistor. Once the integrated photo current is sampled on the current memory cell in the CDS unit 26, the pixel's photodiode voltage is set to $V_{reset}$ by turning on the $M_0$ transistor. The reset photocurrent is presented by Equation (2):

$$I_{reset} = k_n \frac{W}{L}\left[(V_{reset} - V_t)V_{ref} - \frac{V_{ref}^2}{2}\right] \quad (2)$$

The reset current presented by Equation (2) is subtracted from the memorized photocurrent presented by Equation (1). The final current output from the CDS unit 26 is independent of the voltage threshold ($V_t$) of transistor $M_1$ and it is presented by Equation (3):

$$I_{out} = I_{photo} - I_{reset} = k_n \frac{W}{L} V_{ref}(V_{reset} - V_{photo}) \quad (3)$$

Equation (3) holds true as long as the $V_{ds}$ voltage across $M_1$ transistor remains constant during the integration and reset phase. This assumption is only valid in the case of ideal switch transistors, where the impedance is zero and ideal current conveyors are used, where the input voltage is constant as the input current is varied. If the switch transistor is embedded inside the pixel, due to space requirements, a minimum size transistor is often used. Hence, the on-resistance of the switch transistor can be considerably large. For example, a minimum sized transistor in the 0.5 μm process can have on resistance of ~2.5 kΩ. If the difference in photo and reset current is ~10 μA, the drain voltage of transistor $M_1$ can vary ~25 mV. Since typically two switch transistors are used for independent pixel access, these variations of the drain voltage can increase to 50 mV. Variations along the drain line will degrade the linearity of the output and the precision of the CDS correction presented by Equation (3).

In the image sensor of the invention, the resistance due to switches along the direct path of the output photocurrent from transistor $M_1$ to the current conveyor is minimized. Only a single switch is used in this design together with a direct input to a column parallel current conveyor 24. Since the switch transistor $M_2$ is placed outside the imaging array, the aspect ratio can be made very large and the on-resistance can be significantly decreased. For example, a switch transistor $M_2$ with aspect ratio of 200 was implemented in an area of 18 μm by 18 μm and the on-resistance of 15Ω was achieved. The input impedance of the row parallel current conveyer 24 is ~10Ω and the drain voltage variations of transistor $M_1$ are diminished down to 22 μV or three orders of magnitude from traditional implementation. Since the on-resistance of transistor $M_2$ is comparable to the input impedance of the current conveyer 24, two switch transistors outside the pixel (one switch for horizontal and another switch for vertical addressing) and a global (chip-level) current conveyer can also be implemented. A global current conveyer would decrease the power consumption since only a single pixel would be connected to the output and it would also alleviate column FPN problems. However, a global current conveyer would also demand an individual pixel reset scheme and it will increase the number of reset transistors to two for a total of three transistors and an additional control line per pixel. Tradeoffs between speed, power and pixel size should be considered for an optimal implementation.

Two important second order effects should be considered in the implementation of the above image sensor architecture. The first one is input voltage mismatches between the column parallel current conveyors 24. These voltages variations would cause variations between the drain voltages of the read-out transistor $M_1$ among different columns and it will result in a non-zero voltage between the drain and source of the read-out transistors $M_1$. As a result, various pixels across different parts of the image sensor can be simultaneously turned on. This effect can be alleviated using operational amplifier offset compensation techniques or introducing floating gates to individually calibrate the reference voltage on the column parallel current conveyors 24. The second shortcoming of the read out scheme is the mismatches between transistors $M_3$ and $M_4$ in the current conveyor 24. This mismatch will cause gain error between columns and they are minimized in the present implementation by using large aspect ratio transistors. The gain error can be circumvented by employing various calibration schemes implemented either on-chip or executed off-chip using a personal computer (PC) or a digital signal processor (DSP). The on-chip calibration techniques can use a combination of floating gates to minimize row to row variations and/or combination of dedicated memory and digital to analog converters (DACs) that adjust individual $V_{ref}$ levels to compensate for pixel to pixel variations. Both techniques may possibly be implemented on-chip. Moreover, since the addressing switches $M_2$ and $M_4$ are outside the pixel array 10, the addressing switches $M_2$ and $M_4$ may be made much larger, thus reducing voltage drop thereacross.

Alternative Embodiment Including 1.5 Transistors Per Pixel

Figure 4:
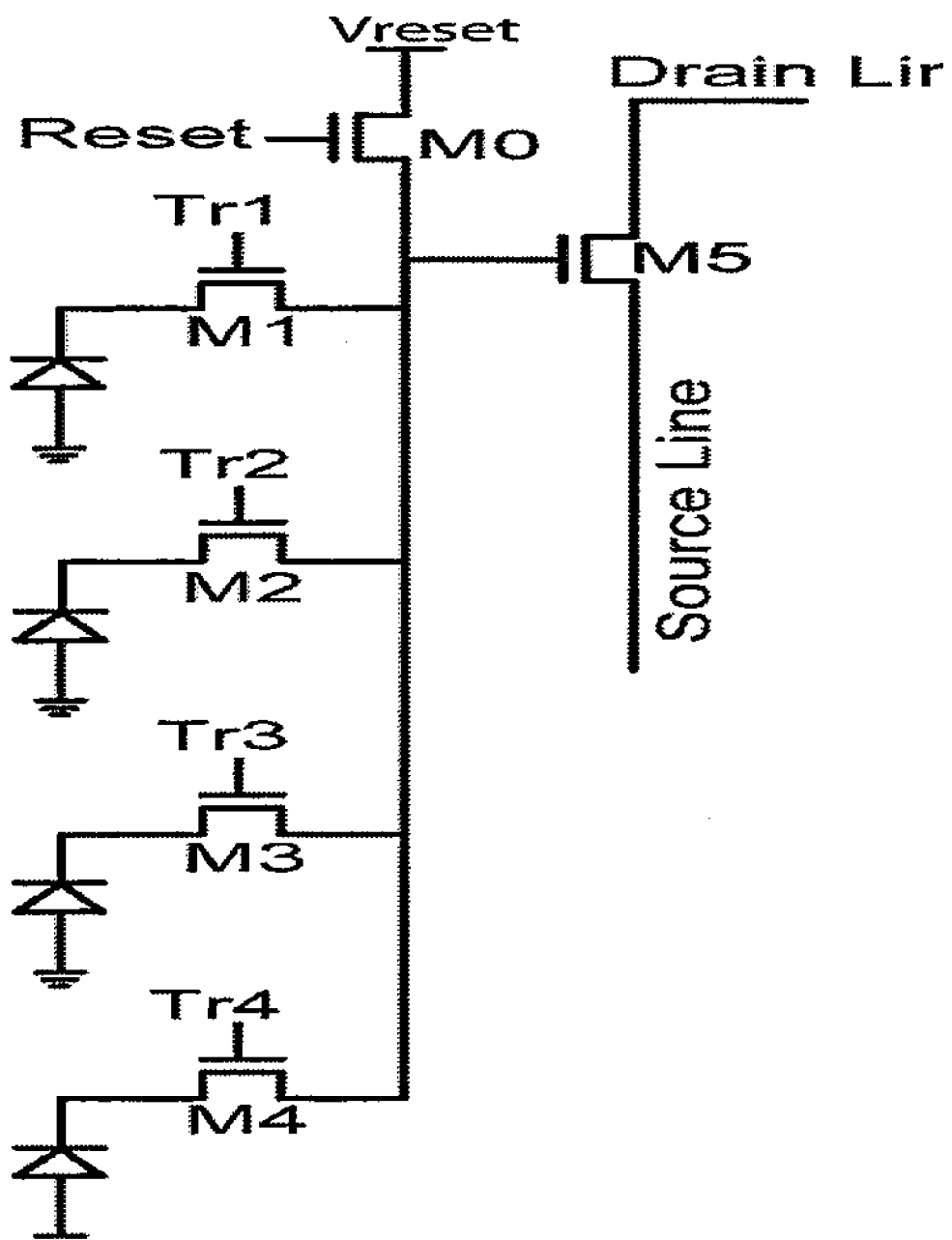
FIG. 4 illustrates a schematic of a shared transistor embodiment of the invention whereby four neighboring pixels share a readout transistor so that each pixel is represented by 1.5 transistors.
Figure 5:
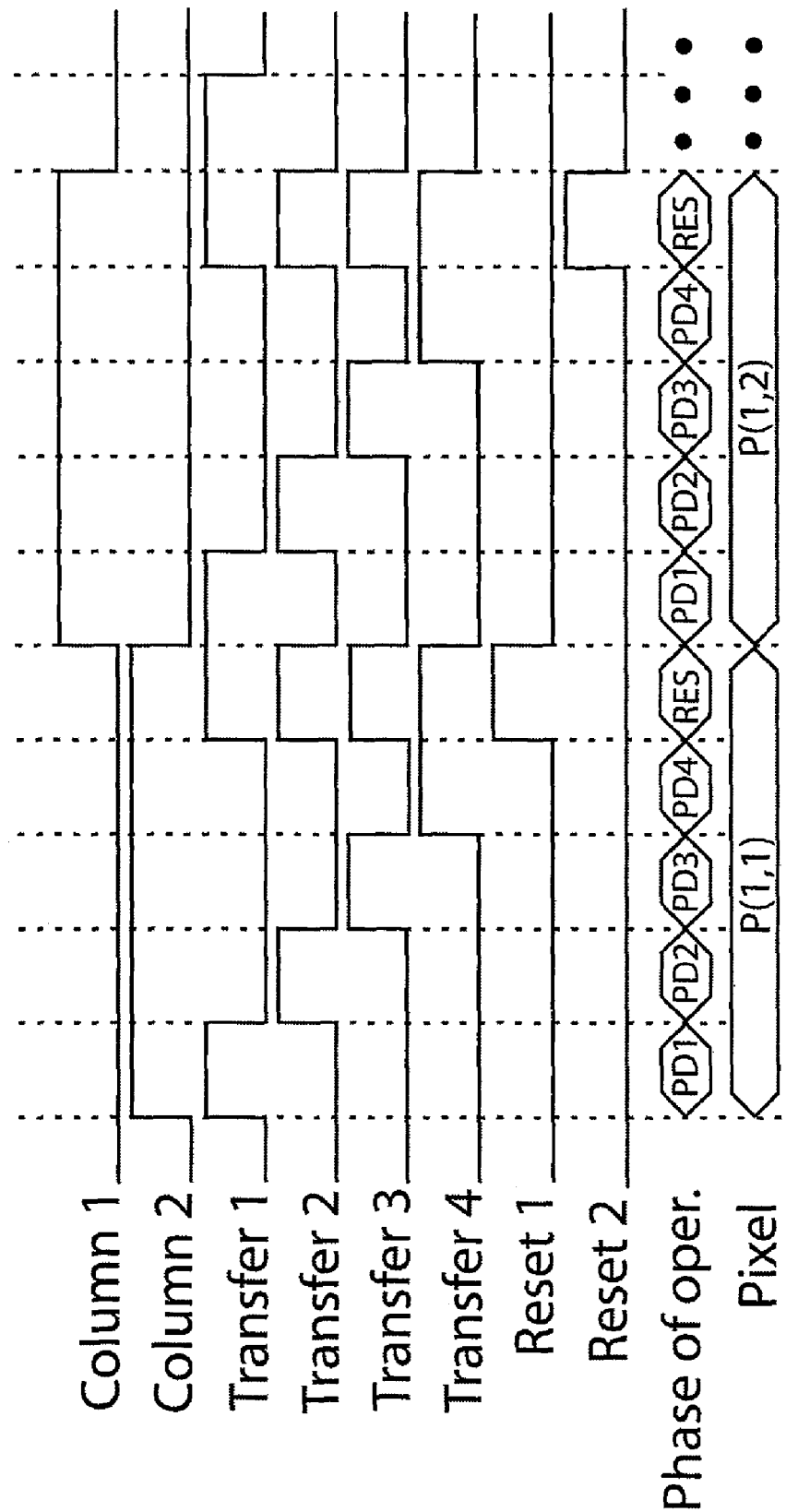
FIG. 5 illustrates a timing diagram for the 1.5 transistor pixel embodiment of FIG. 4.

One effective scheme that allows reducing the transistor count per pixel is to share common transistors in a neighborhood of pixels to create a "super pixel." FIG. 4 presents an extension of the 2T pixel embodiment above for creation of a 1.5 transistor current mode image sensor where a reset transistor ($M_0$) and read-out transistor ($M_5$) are shared among four neighboring photodiodes. The introduction of the transfer switch transistors $M_1$ through $M_4$ allows for individual access of the 4 photodiodes and it reduces the transistor count to 1.5 per pixel. The timing diagram for operating this pixel is presented in FIG. 5. The arrangement of the 1.5T pixels is similar to the 2T image sensor described with respect to FIG. 1, where each pixel in FIG. 1 is replaced with a "super pixel" presented in FIG. 4. Once a "super pixel" is accessed by turning on column switch transistors in the periphery, the four transfer transistors are turned on sequentially by pulsing transfer lines Tr1 through Tr4. Hence, the integrated photo currents from the four photo diodes are memorized in four different CDS units 26. The pixel is then reset and a reset current is subtracted form the CDS units 26. The final current outputs are presented by Equation 3 and they have eliminated threshold voltage variations of the read out transistors $M_1$ in the imaging array. During the reset period, the four transfer transistors are turned on in order to reset the photodiodes. By turning off the transfer switch transistors $M_1$ through $M_4$, the gate voltage of the read out transistor can be controlled via the reset transistor without affecting the individual photodiodes. Hence, the gate voltage of the read out transistor can be set below the threshold voltage in order to turn off the pixel output. In this case, the integration period can be extended to a frame time. This embodiment thus employs manipulations of biasing voltages of the readout transistors of the pixels to address individual pixels. Moreover, the elimination of the address transistor allows for higher linearity and better noise performance compared to prior art imaging devices.

Those skilled in the art will appreciate that the orthogonality requirement for the drain lines 12 and source lines 14 may be relaxed in this embodiment since the additional transfer gate transistors may act as extra addressing switches. The addressing of individual photodiodes is done via the gate of the transfer switch transistors Tr1 to Tr4. In other words, the x,y addressing may be accomplished without requiring the drain and source lines to be perpendicular to each other (see, e.g., embodiments in FIGS. 6 and 7 below). For example in one of the exemplary embodiments, the orthogonality principle applies to the line controlling the gate of the transfer transistor Tr1, etc. and the source/drain of the readout transistor $M_1$. Those skilled in the art will also appreciate that the lower number of transistors per pixel for this embodiment also allows for higher resolution and more pixels per given area of silicon. Also, in this embodiment, as in the embodiment of FIG. 1, all drains in a given column or row are directly connected to each other (i.e., not through an addressing switch), and/or all sources in a given row or column are directly connected to each other.

Image Sensor with Global CDS Unit

Figure 6:
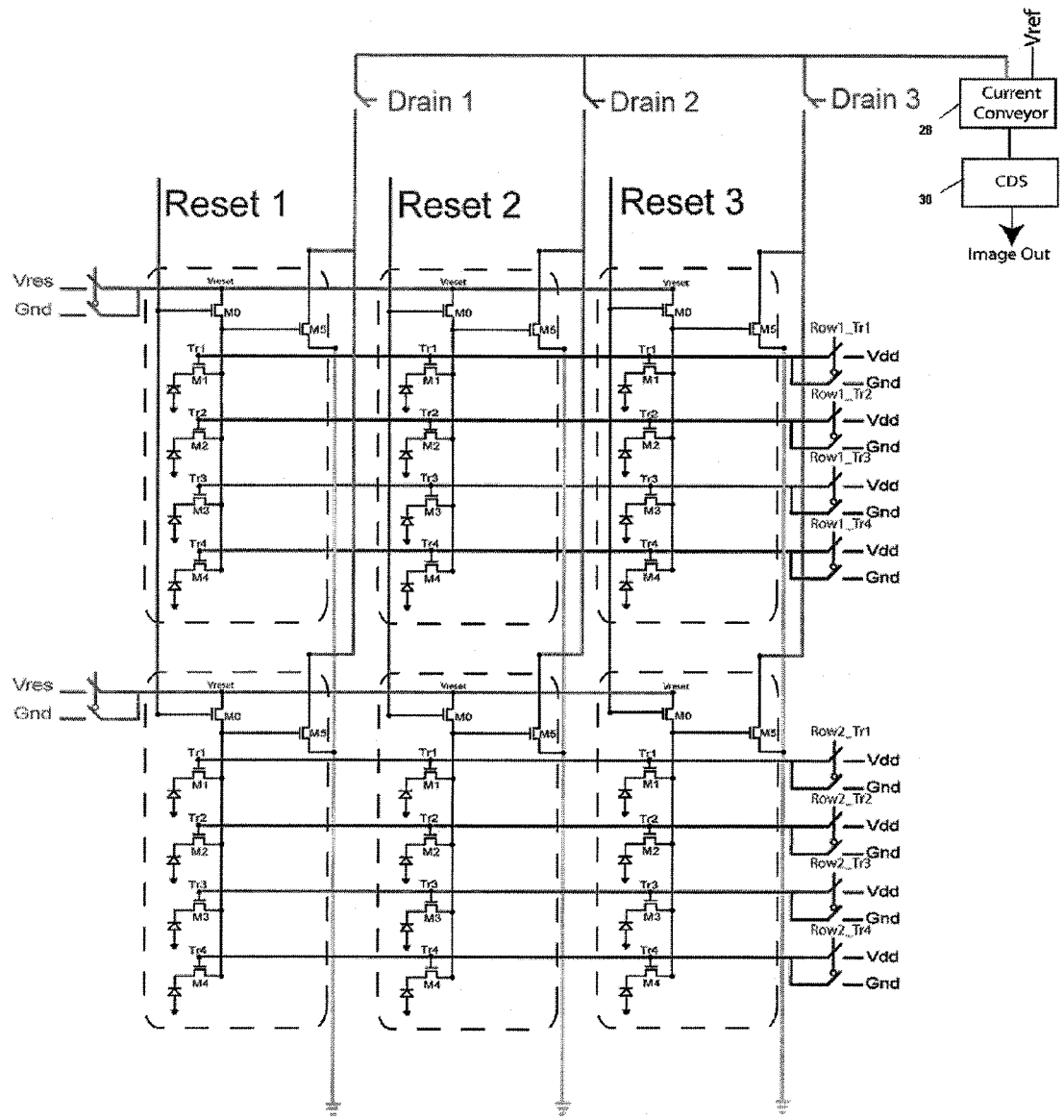
FIG. 6 illustrates an alternative implementation of a current mode image sensor using the 1.5 pixel topology of FIG. 4.

An alternative implementation of the current mode image sensor using the 1.5 transistor pixel topology presented in FIG. 4 is shown in FIG. 6. In this implementation, a global current conveyor 28 and global CDS unit 30 is used instead of row parallel current conveyors 24 and CDS units 26. The benefits of using a single CDS unit 30 in the imaging sensor are two fold. First, the power consumption is lowered since only a single pixel outputs its current value to the global CDS unit 30. Second, column base FPN is eliminated due to the global current conveyor 28 implementation. The load capacitance of the current conveyor 28 is much larger in this embodiment and the read out speed is higher than in the embodiment of FIG. 4. Since the pixel is composed of four photodiodes which are individually accessed via transfer gates, the total transistor count per pixel is 1.5 transistors. The mode of operation of the image sensor is very similar to the timing diagrams presented in FIG. 2 and FIG. 5. The additional control signals on the transfer gate (e.g. Tr$_1$-Tr$_4$) allow for pixels that are not being read out to have gate voltage equal to 0 volts. For these pixels, both the source to drain voltage is approximately zero and the gate voltage is equal to zero volts.

Figure 7:
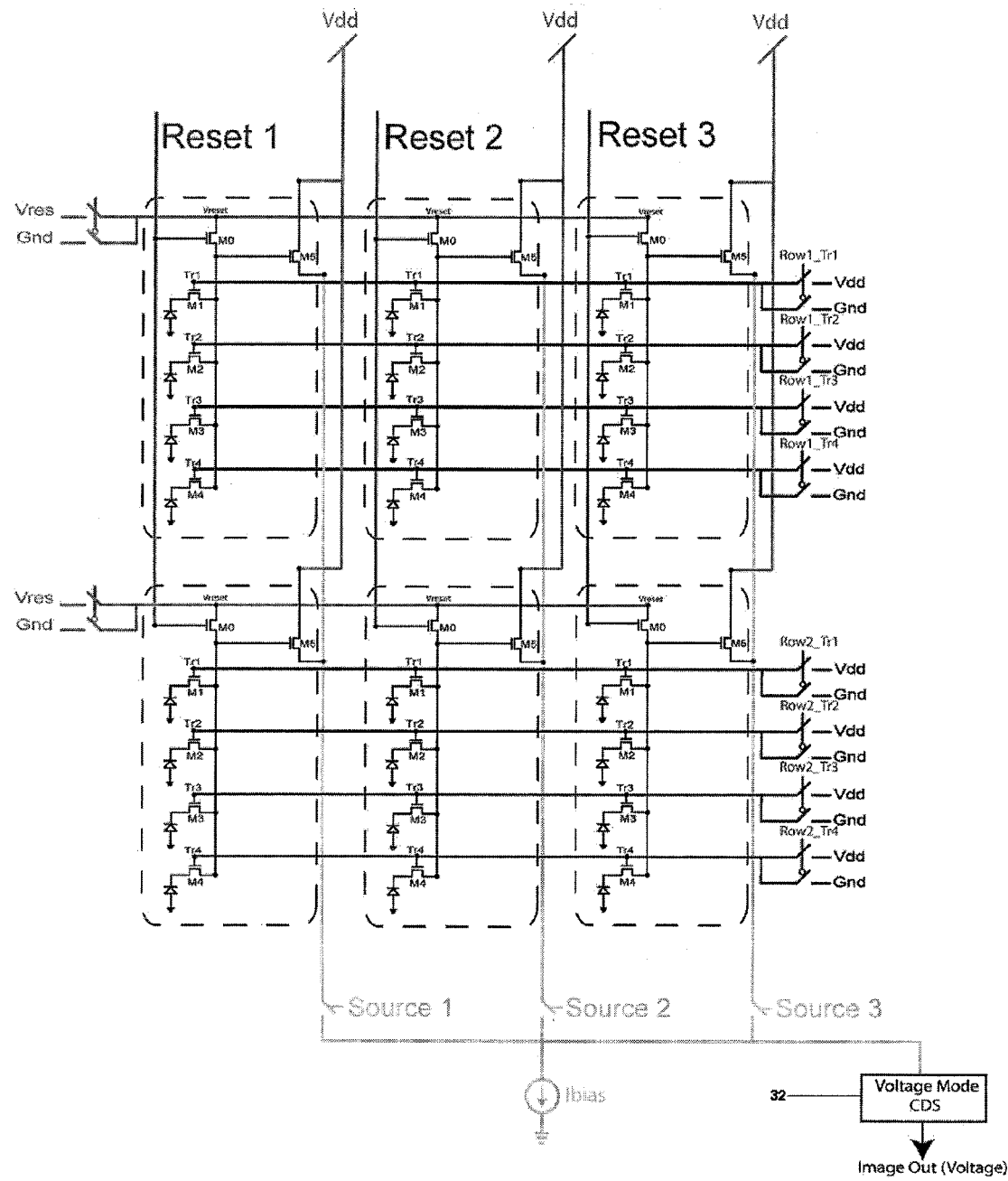
FIG. 7 illustrates an alternative implementation of a voltage mode image sensor using the 1.5 pixel topology of FIG. 4.

The current mode image sensor presented in FIG. 6 can also be implemented in the voltage mode domain as shown in FIG. 7. In this architecture, the drain voltages of the read out transistor $M_1$ of all pixels are connected to $V_{dd}$ potential and the source terminals are connected to a biasing circuit such as a global current source ($I_{bias}$) via a switch transistor at the periphery of the imaging array. Since the address/switch transistor is moved outside the pixel, the output of the pixel is controlled via manipulating the gate voltage. In order to turn off a row(s) of pixels, the gate voltage of the read out transistor ($M_5$) is set below the threshold voltage, via the reset transistor. This ensures that no channel is formed under the gate of transistor $M_5$. Furthermore, the source line of the column(s) of pixels that are turned off is floating and it will charge up to $V_{dd}$ potential. A differential switch can be implemented in order to set the source of the off-pixels to $V_{dd}$ potential. This will further minimize any sub threshold leakage currents that might occur on the read out lines. A column of pixels are turned on by connecting the source of these pixels to a current source $I_{bias}$ via a switch transistor at the bottom of the array. The pixel of interest in the given column is accessed by turning on the transfer transistor ($M_1$ through $M_4$) and effectively transferring the accumulated photodiode voltage to the gate of transistor $M_5$. Since transistor $M_5$ operates in a source follower configuration, the source of transistor tracks the gate of transistor $M_5$. The voltage mode CDS unit 32 samples the integrated photodiode voltage and subtracts it from a reference reset voltage. Hence, offset variations are effectively eliminated in the CDS unit 32.

Image Sensor Measurements

Figure 8:
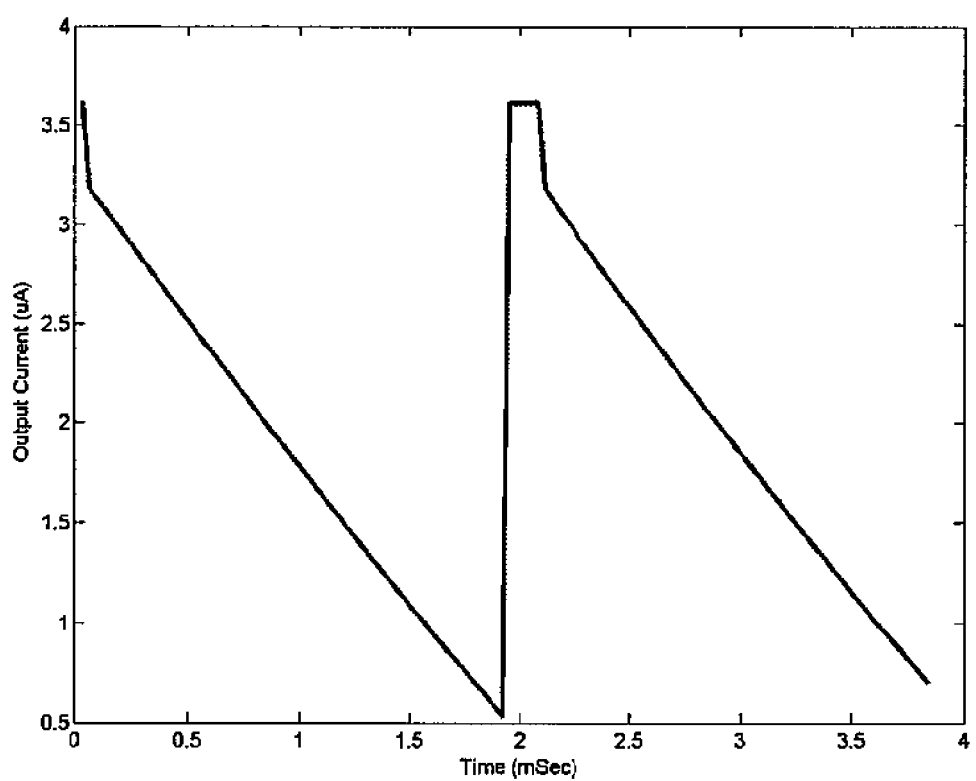
FIG. 8 illustrates the measured linear current output with respect to photodiode integrated voltage for an exemplary embodiment of the invention.

A prototype image sensor having 50 by 128 pixels has been fabricated in a standard 1Poly 3Metal CMOS 0.5 μm process. In FIG. 8, the linearity of the measured output photocurrent from the pixel with respect to time (i.e., integrated photodiode voltage) is measured. The pixel was reset at ~1.8 msec for about 100 μsec. The reset current is 3.6 μA and it can be manipulated by changing either the reset voltage, $V_{reset}$, or the drain voltage of transistor $M_1$, $V_{ref}$ in FIG. 1. When the reset transistor $M_0$ is turned off, charge injections at the photodiode node are introduced and they are observed in FIG. 8. These charge injections have been minimized by using a minimum width reset transistor. The linear relationship between output photo current and photodiode voltage (i.e. time) is observed in both FIG. 8 and FIG. 9.

Figure 9:
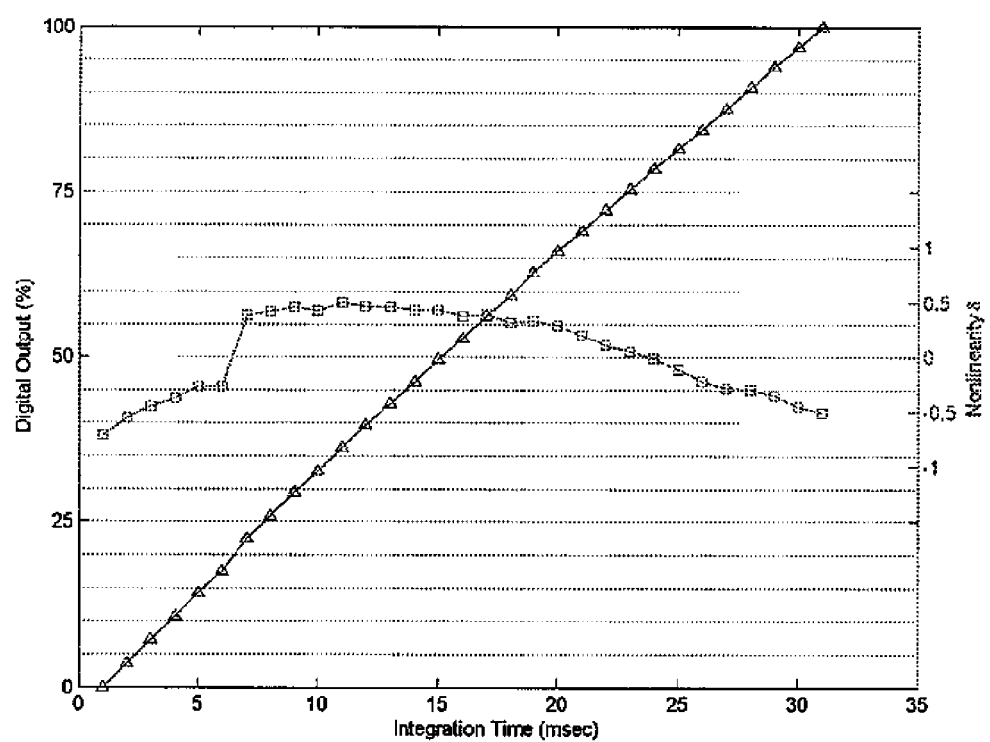
FIG. 9 illustrates the measured linearity of the photo pixel output with respect to integration time for an exemplary embodiment of the invention.
Figure 10:
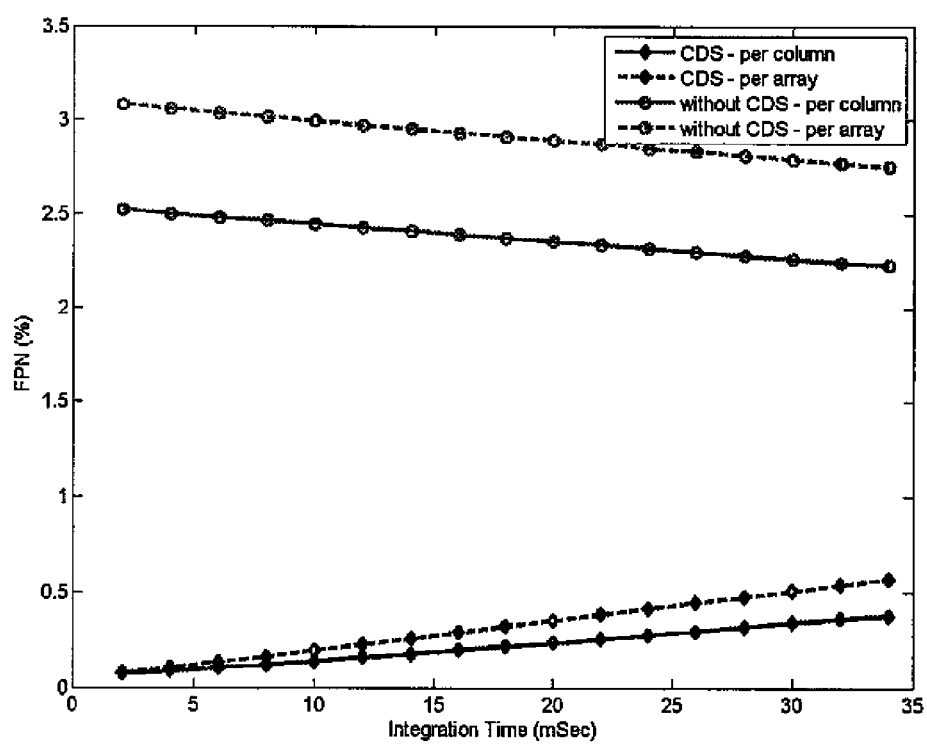
FIG. 10 illustrates the measured linear current output with respect to photodiode integrated voltage for an exemplary embodiment of the invention.

FIG. 9 presents the linearity of the photo pixel current with respect to time as the photodiode discharges by 1. V during the 33 msec integration period. The linear output photocurrent is digitized off-chip with an analog to digital converter (ADC) whose range is set to be 1.1V (i.e. the ADC is set to match the range of the output photocurrent). The left vertical axis presents the final photocurrent presented off-chip. The right vertical axis presents the nonlinearity computed as a ratio of the deviations from a linear fit (i.e. the residuals) to the saturated value. The linearity of the output photo current is within 99.5% during the entire integration period. The weak non-linearity can be due to the non linear discharge of the photodiode voltage, mobility degradation of the read-out transistor in the pixel with respect to the gate voltage (i.e. photodiode voltage) and/or non constant $V_{ds}$ voltage across the read out transistor due to finite resistance of the switch transistor and finite resistance of the current conveyor.

The improved linearity of the output photo current has a direct impact on the fixed pattern noise figures. The FPN measurement of the exemplary image sensor is presented in FIG. 10. The image sensor was uniformly illuminated with 1 mW/cm² light intensity and the integration time of the photodiode was varied between 1 msec and 33 msec. The worst case uncorrected FPN was measured to be 2.5% per row and 3.2% for the entire image from the saturated value when the sensor's integration time is 1 msec. The uncorrected FPN improves to 2.3% per row and 2.7% for the entire image for integration time of 33 msec. The larger FPN figure for shorter integration time is due to variations in both offset input voltage and mismatches of transistor $M_3$ and $M_4$ in the current conveyors. Both of these factors produce a gain error between columns. For long integration times, the output current from the pixel is lower compared to short integration times. Hence, the gain variations are less obvious for smaller currents (i.e. for longer integration times). When CDS is performed on the output photo current, the FPN figures drop to 0.4% per row and 0.6% for the entire image form the saturation value for integration time of 33 msec. The larger FPN figure for longer integration time is primarily due to voltage variations of the input node of the current conveyor during the reset and integration phase. For longer integration time, the difference between the reset and integrated photocurrent is large (around 3 µA is observed in FIG. 8) and the voltage difference across the input node of the current conveyor (around 36 µV) will introduce error in the final output current. For small integration time, the input node of the current conveyor remains virtually constant since the difference between the reset and integrated photocurrent is very small. Hence, the CDS unit effectively cancels out threshold variations between various transistors.

Figure 11:
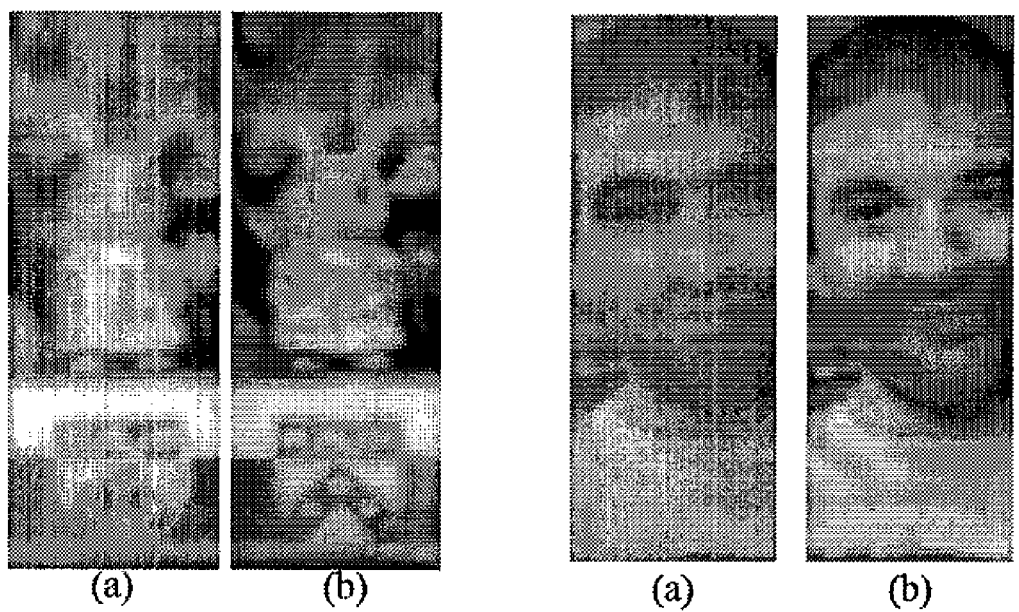
FIG. 11 illustrates sample images from an exemplary embodiment of the invention or an uncorrected image (a) and after CDS noise cancellation (b).

FIG. 11 shows sample images recorded from the sensor. Images (a) in FIG. 11 present the original image without any noise suppression. In these images, large variations across the entire image, as well as column variations are observed. Images (b) in FIG. 11 present the result image after CDS noise suppression. In the noise corrected images, one can still observe column base FPN. Variations between pixels in a single column are less visible in the noise corrected image. The low FPN figures are closely related to the improved linearity of the output photocurrent. The measured input referred noise of the image sensor is 7.5 mV and the signal to noise ratio (SNR) is 43.3 dB.

SUMMARY

The image sensor embodiments described herein are characterized by the fact that the addressing switch is moved outside the pixel array 10 and the function of the address switch in the pixel is performed by the readout transistor by applying appropriate bias voltages to the readout transistor from outside the pixel array to turn the readout transistor on or off at the appropriate times for readout. The readout transistor may be turned on when its gate-source voltage $V_{gs}$ is greater than a threshold and the drain-source voltage $V_{ds}$ is greater than zero. The readout transistor may be turned off when $V_{gs}$ is less than the threshold or $V_{ds}=0$.

The exemplary two transistor image sensor for which data is presented in FIGS. 8-11 is summarized in Table 3. The maximum scanning rate is limited by the virtual ground circuit to 50 MHz. Using 50×128 (1000×1000) pixel array, a frame rate of 25 k (41) frames per second can be achieved. The low fixed pattern noise of 0.4% from the saturation value is comparable to voltage mode APS and the image sensor can be used as a front end for many current mode computational image sensors. The low power consumption of this system of 5 mW is another advantage of current mode imaging systems.

TABLE 3

| Technology | 0.5 µm Nwell CMOS |
|---|---|
| No. Transistors | 25K |
| Array Size | 50 × 128 |
| Pixel Size (Fill Factor) | 18 µm × 18 µm (36%) |
| Chip Size | 1.5 mm × 3 mm |
| FPN with CDS row (entire) | 0.4% (0.6%) of sat. level |
| FPN without CDS row (entire) | 2.5% (3.2%) of sat. level |
| Measured Input Referred Noise | 7.5 mV |
| SNR | 43.3 dB |
| Saturation level | 3.5 µA |
| Power Consumption | 5 mW |

While the present invention has been described in connection with the preferred embodiments of the various figures, it is to be understood that other similar embodiments may be used or modifications and additions may be made to the described embodiment for performing the same function of the present invention without deviating therefrom. For example, those skilled in the art will appreciate that the imaging sensor embodiments described herein may be used for high resolution imaging or as a front end for other image processing applications such as on-chip extraction of polarimetric images, shape extraction or motion detection images. In addition, those skilled in the art will appreciate that there are multiple ways of connecting the photodiode in each pixel to the reset transistor and read out. These transistors may be NMOS, PMOS or any other combination. Hence, the drain, source, ground and $V_{DD}$ terms used herein may be interchanged depending upon the configuration. Similarly, references to row or column may be referenced herein without changing the principles of the invention. Therefore, the present invention should not be limited to any single embodiment, but rather should be construed in breadth and scope in accordance with the appended claims.

What is claimed is:

1. An image sensor comprising:
    a biasing circuit; and
    a pixel array, each pixel in the pixel array comprising a photodiode, a reset transistor, and a readout transistor, wherein the reset transistor controls operation of the photodiode and the gate voltage of the readout transistor, and
    wherein the readout transistor is configured to provide an output proportional to a voltage or current output of the photodiode, where the drains of readout transistors of each pixel in the same row or column are connected directly together and to said biasing circuit or the sources of readout transistors of each pixel in the same row or column are connected directly together and to said biasing circuit, wherein reference voltages or currents from said biasing circuit are applied to said readout transistor to turn on said readout transistor when an output of the photodiode is to be read out and to turn off said readout transistor when an output of the photodiode is not to be read out whereby an address transistor is not required in each pixel to turn on said readout transistor.

2. The image sensor of claim 1, wherein the photodiode is connected between ground or a predetermined voltage and a source of said reset transistor and a drain of said reset transistor is connected to a reset voltage.

3. The image sensor of claim 2, wherein a gate of said readout transistor is connected to said source of said reset transistor.

4. The image sensor of claim 3, wherein the drains of each readout transistor in a row are connected directly to each other in a direction parallel to said row and the sources of each readout transistor in a column are connected directly to each other in a direction perpendicular to said row.

5. The image sensor of claim 1, wherein the biasing circuit comprises a current conveyor circuit for each row or column of said pixel array, said current conveyor circuit pinning an input line thereto to a reference voltage.

6. The image sensor of claim 5, wherein each current conveyor circuit comprises an operational amplifier connected to said reference voltage at a first input and to a row or column of connected drains or sources for the readout transistors of each pixel in said row or column of said pixel array at a second input.

7. The image sensor of claim 5, further comprising a row or column addressing switch connected to an output of each current conveyor circuit for selecting the corresponding row or column for read out.

8. The image sensor of claim 7, further comprising a correlated double sampling unit connected to each addressing switch for sampling and storing an input photocurrent from one or more of said pixels.

9. The image sensor of claim 7, further comprising a column or row addressing switch connected to each column or row of connected sources or drains for the readout transistors of each pixel in each column or row of said pixel array.

10. The image sensor of claim 1, wherein the biasing circuit comprises a global current conveyor circuit for said pixel array, said global current conveyor circuit pinning an input line thereto to a reference voltage.

11. An image sensor comprising:
a biasing circuit; and
a pixel array, each pixel in the pixel array comprising a photodiode and a transfer switch transistor and sharing a reset transistor and a readout transistor with a plurality of other pixels in the pixel array,
wherein the transfer switch transistor controls operation of the photodiode and the gate voltage of the readout transistor,
wherein the readout transistor is configured to provide an output proportional to a voltage or current output of the photodiode, where the drains of readout transistors in the same row or column are connected directly together and to said biasing circuit or the sources of readout transistors in the same row or column are connected directly together and to said biasing circuit, wherein reference voltages or currents from said biasing circuit are applied to said readout transistor to turn on said readout transistor when an output of the photodiode is to be read out and to turn off said readout transistor when an output of the photodiode is not to be read out whereby an address transistor is not required in each pixel to turn on said readout transistor, and
wherein the photodiode is connected between ground or a predetermined voltage and the transfer switch transistor and the transfer switch transistor is, in turn, connected to a source or drain of said reset transistor, wherein a drain or source of said reset transistor is connected to a reset voltage and said reset transistor is shared by said plurality of pixels in said pixel array.

12. The image sensor of claim 11, wherein a gate of said readout transistor is connected to said source or drain of said reset transistor and said readout transistor is shared by said plurality of pixels in said pixel array, wherein properly biasing the gate of the transfer switch transistor for a pixel connects the photodiode for said pixel to the gate of the readout transistor.

13. The image sensor of claim 12, wherein said plurality of pixels is 4 whereby each pixel utilizes an equivalent of 1.5 transistors.

14. The image sensor of claim 12, wherein the sources or drains of each readout transistor in a column or row of pixels are connected to each other and to ground or suitable voltage and the drains or sources of each readout transistor in said column or row of pixels are connected to each other directly and to said biasing circuit through an addressing switch.

15. The image sensor of claim 12, wherein the drains of each readout transistor in a column or row of pixels are connected directly to each other and to a reference voltage and the sources of each readout transistor in said column or row of pixels are connected to the biasing circuit through an addressing switch.

16. The image sensor of claim 15, wherein said biasing circuit comprises a bias current source.

17. The image sensor of claim 16, further comprising a voltage mode correlated double sampling unit connected to said sources of said readout transistors in said column or row of pixels through said addressing switch.

18. The image sensor of claim 11, wherein a gate of the transfer switch transistor of each pixel in a row or column is controlled by an addressing switch outside the pixel array that selectively connects the transfer switch transistors of said row or column to said biasing circuit so as to select the pixels containing each of said transfer switch transistors.

19. The image sensor of claim 18, wherein the drain or source of the reset transistor of said plurality of pixels is connected to the reset transistors of other pluralities of pixels in common rows or columns of said pixel array, the drains or sources of said connected reset transistors being further selectively connected to the biasing circuit.

20. The image sensor of claim 19, wherein said biasing circuit comprises a current conveyor that pins an input line thereto to a reference voltage.

21. The image sensor of claim 20, further comprising a correlated double sampling unit connected to an output of said current conveyor sampling and storing an input photocurrent from one or more of said pixels.

* * * * *